Patented Sept. 4, 1951

2,566,382

UNITED STATES PATENT OFFICE 2,566,382

ARSENICAL COMPOUNDS AND METHODS FOR OBTAINING THE SAME

Leon A. Sweet and Edward W. Tillitson, Grosse Pointe, Mich., assignors to Parke, Davis & Company, Detroit, Mich., a corporation of Michigan No Drawing. Application September 17, 1947, Serial No. 774,676

6 Claims. (Cl. 260—440)

This invention relates to a new class of sulfur-containing arsenical compounds and to methods for obtaining the same. More particularly, the invention relates to a class of compounds having the formula,

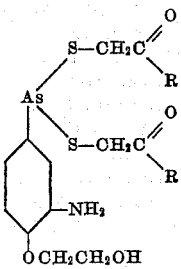

where R is —OH, —O-alkyl of 1 to 12 carbons inclusive or —NH₂.

The compounds of the present invention may be obtained in the non-salt form having the formula given above or in the form of their acid addition salts with strong acids such as hydrochloric, hydrobromic, sulfuric, citric, tartaric and the like acids. The products containing acidic groups, that is, the carboxyl groups, can be obtained in the form of their alkali metal salts as well as in their non-salt and acid addition salt forms.

In accordance with the invention the new sulfur-containing arsenic compounds are obtained by reacting a mercapto acid compound of the formula,

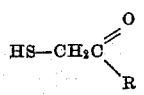

with a 3-amino-4-β-hydroxyethoxybenzene arsenic compound of the formula,

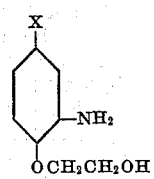

where R has the same significance as given above and X is —AsO, —AsO₃H₂, —As(OH)₂, —AsCl₂ and —AsBr₂. In general, the reaction is effected merely by mixing the two reactants in a solvent such as water, alcohols, lower aliphatic ketones, dioxane or mixtures of the same. Several different methods may be used to isolate the product from the reaction mixture. For example, when the reaction is carried out in a non-aqueous solvent such as ethanol the free base may be obtained by evaporation of the reaction mixture to dryness. Alternatively, the product may be precipitated as an acid addition salt by adding an equivalent amount of acid to the alcoholic reaction mixture and the free base obtained by neutralization of an aqueous solution of the salt. When the product contains a carboxyl group it can be isolated as an alkali metal salt. This may be accomplished, for example, by adding an organic solvent such as alcohol to the aqueous reaction mixture.

When 3-amino-4-β-hydroxyethoxybenzenearsonic acid is used as the starting material, four equivalents instead of the customary two equivalents of the mercapto acid compound are required. Two of the equivalents of the mercapto acid compound function as a reducing agent to first reduce the arsonic acid to the arsonous acid which then reacts with the other two equivalents of the mercapto acid compound. The oxidized mercapto acid compound formed during the reaction appears in the reaction mixture as the disulfide which in most instances is soluble in the reaction mixture.

The new sulfur-containing arsenic compounds and their salts are useful therapeutic agents and find particular application as trypanocidal and spirocheticidal agents. The preferred compounds of the invention are the alkyl esters containing about 6 to 12 carbon atoms in the alkyl radicals. Such products are especially valuable due to their high degree of solubility in vegetable oils. The vegetable oil solutions of these products when injected intramuscularly provide a more constant and prolonged therapeutic effect than is obtainable with aqueous solutions of the new products or their salts. Within this particular sub-group of compounds the —C₈H₁₇ or octyl esters seem to be optimal in that they combine the maximum of therapeutic activity and oil solubility with a minimal molecular weight.

The invention is illustrated by the following examples.

Example 1.—(3-amino-4-β-hydroxyethoxyphenyl) di-(carboxymethylmercapto)arsine

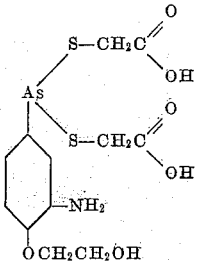

(a) 18.4 g. of mercaptoacetic acid is added to an aqueous solution of 26.1 g. 3-amino-4-β-hydroxyethoxybenzenearsonous acid and the pH adjusted to 7 with 10 N sodium hydroxide solution. Seven volumes of ethanol are added and the crystalline sodium salt of (3-amino-4-β-hydroxyethoxyphenyl) di-(carboxymethylmercapto)arsine which separates collected.

When potassium hydroxide is substituted for the sodium hydroxide used in the above procedure one obtains the potassium salt of (3-amino-4-β-hydroxyethoxyphenyl) di-(carboxymethylmercapto)-arsine.

15 g. of the sodium salt of (3-amino-4-β-hydroxyethoxyphenyl) di-(carboxymethylmercapto)arsine is dissolved in a small amount of water and the solution treated with two equivalents of dilute hydrochloric acid. The free (3-amino-4-β-hydroxyethoxyphenyl) di-(carboxymethylmercapto)arsine which separates is collected and recrystallized from water.

(b) An absolute ethanol solution of 18.4 g. of mercaptoacetic acid is added to a solution of 26.1 g. of 3-amino-4-β-hydroxyethoxybenzenearsonous acid in absolute ethanol with stirring. The free (3-amino-4-β-hydroxyethoxyphenyl) di-(carboxymethylmercapto)arsine present in the solution is converted to the hydrochloride salt by the addition of dry hydrogen chloride gas with cooling. The crystalline hydrochloride salt of (3-amino-4-β-hydroxyethoxyphenyl) di-(carboxymethylmercapto)arsine which separates is collected, washed with a small amount of alcohol and dried.

Example 2.—(3 - amino - 4 - β - hydroxyethoxyphenyl) di-(carboctyloxymethylmercapto)arsine

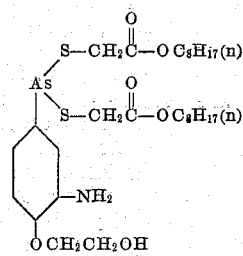

An absolute ethanol solution of 40.8 g. of n-octyl mercaptoacetate is added slowly with stirring to 26.1 g. of 3-amino-4-β-hydroxyethoxybenzenearsonous acid dissolved in a minimal amount of absolute ethanol. The free base of the desired (3-amino-4-β-hydroxyethoxyphenyl) di-(carboctyloxymethylmercapto)arsine can be isolated by evaporation of the solvent under reduced pressure or the base may be converted to the hydrochloride salt by addition of dry hydrogen chloride gas to the alcoholic solution. The white hydrochloride salt which separates from the solution in crystalline form is collected, washed with a small amount of alcohol and dried.

Example 3.—(3 - amino - 4 - β - hydroxyethoxyphenyl) di-(carbomethoxymethylmercapto)arsine

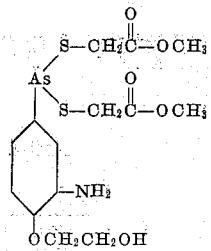

An alcoholic solution containing 21.2 g. of methylmercaptoacetate is added with stirring to an absolute alcohol solution of 26.1 g. of 3-amino-4-β-hydroxyethoxybenzenearsonous acid. The free (3-amino-4-β-hydroxyethoxyphenyl) di-(carbomethoxymethylmercapto)arsine which remains dissolved in the solution is precipitated as the hydrobromide salt by the addition of dry gaseous hydrogen bromide with cooling. The white, crystalline salt is collected, washed with a small amount of ethanol and dried. If desired, the free base may be obtained by dissolving the hydrobromide salt in water and adding an equivalent of dilute sodium hydroxide solution. The free base which precipitates is collected, washed with a little water and dried.

When ethyl mercaptoacetate is substituted in the above procedure for the methylmercaptoacetate one obtains (3-amino-4-β-hydroxyethoxyphenyl) di-(carbethoxymethylmercapto)arsine.

In a similar manner when isopropyl mercaptoacetate is used one obtains (3-amino-4-β-hydroxyethoxyphenyl) di - (carbisopropoxymethylmercapto)arsine.

Example 4.—(3-amino - 4 - β - hydroxyethoxyphenyl) di-(carb-2'-ethylhexyloxymethylmercapto)arsine

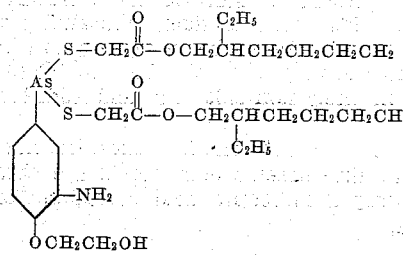

40.4 g. of 2-ethylhexyl mercaptoacetate dissolved in absolute ethanol is added to an absolute ethanol solution containing 26.1 g. of 3-amino-4-β-hydroxyethoxybenzenearsonous acid with stirring. The free (3-amino-4-β-hydroxyethoxyphenyl) di-(carb-2'-ethylhexyloxymethylmercapto)arsine formed in the solution is precipitated as the hydrochloride salt by the addition of an excess of dry hydrogen chloride gas with cooling. The hydrochloride salt is collected, dissolved in a small amount of water and the solution made alkaline with 10% sodium hydroxide solution. The free base of the desired (3-amino-4-β-hydroxyethoxyphenyl di-(carb-2'-ethylhexyloxymethylmercapto)arsine which separates is collected, washed with water and dried.

Example 5.—(3-amino-4-β-hydroxyethoxyphenyl) di-(carbamidomethylmercapto)arsine

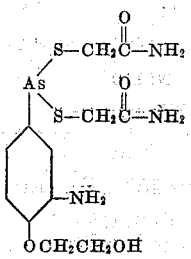

18.2 g. of β-mercaptoacetamide is added to an aqueous solution containing 26.1 g. of 3-amino-4-β-hydroxyethoxybenzenearsonous acid and the 10 N sodium hydroxide solution added to the mixture until the pH reaches a value of about 8. The crude free base of (3-amino-4-β-hydroxyethoxyphenyl) di-(carbamidomethylmercapto)-arsine which separates is collected, dissolved in absolute ethanol and treated with an excess of dry hydrogen chloride gas. The hydrochloride salt which separates is collected, washed with alcohol and dried.

Example 6.—(3-amino-4-β-hydroxyethoxyphenyl) di-(carb-1'-methylheptyloxymethylmercapto)arsine

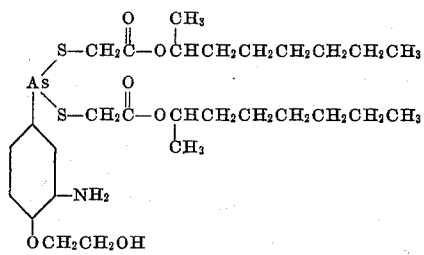

A solution of 40.8 g. of 1-methylheptyl mercaptoacetate in absolute ethanol is added to an absolute ethanol solution of 24.3 g. of 3-amino-4-β-hydroxyethoxybenzene arsine oxide with stirring. The reaction mixture is evaporated to about one-half volume under reduced pressure and the residue treated with an excess of dry hydrogen chloride gas. The hydrochloride salt of the desired product which separates on cooling is collected, washed with a small amount of alcohol and dried. The crude hydrochloride salt is dissolved in water and the solution made alkaline with 10% sodium hydroxide solution. The free base of (3-amino-4-β-hydroxyethoxyphenyl) di-(carb-1'-methylheptyloxymethylmercapto)-arsine which precipitates is collected, washed with water and dried.

Example 7.—(3-amino-4-β-hydroxyethoxyphenyl) di-(carbodecyloxymethylmercapto)arsine

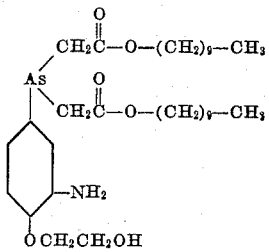

46.4 g. of n-decyl mercaptoacetate in absolute ethanol is added to an absolute ethanol solution containing 31.8 g. of dichloro (3-amino-4-β-hydroxyethoxyphenyl) arsine and the solution evaporated to dryness under reduced pressure. The residue is taken up in water, the aqueous solution made alkaline with dilute sodium hydroxide solution and the (3-amino-4-β-hydroxyethoxyphenyl) di-(carbodecyloxymethylmercapto) arsine which separates collected.

What we claim as our invention is:

1. A compound of the formula,

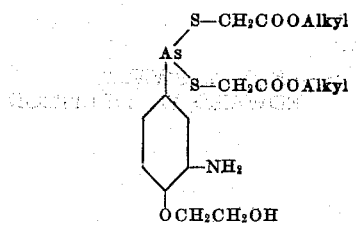

and non-toxic acid addition salts thereof, where alkyl contains 6 to 12 carbon atoms.

2. A compound of the formula,

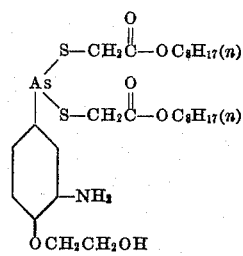

and non-toxic acid addition salts thereof.

3. A compound of the formula,

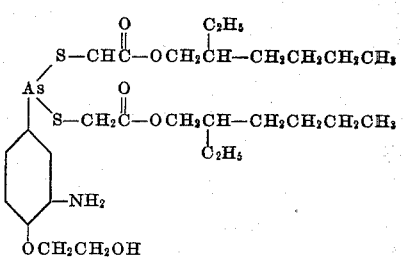

and non-toxic acid addition salts thereof.

4. A compound of the formula,

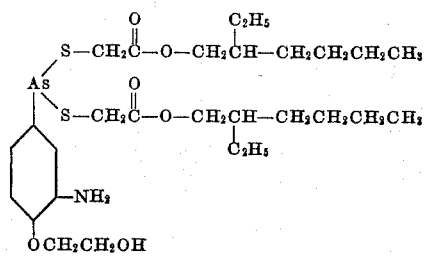

5. A compound of the formula,

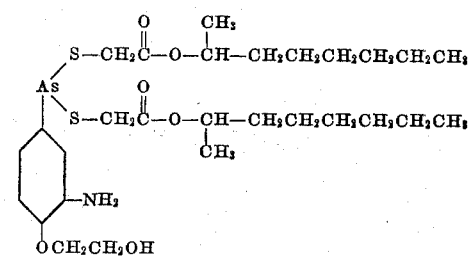

and non-toxic acid addition salts thereof.

6. A compound of the formula,
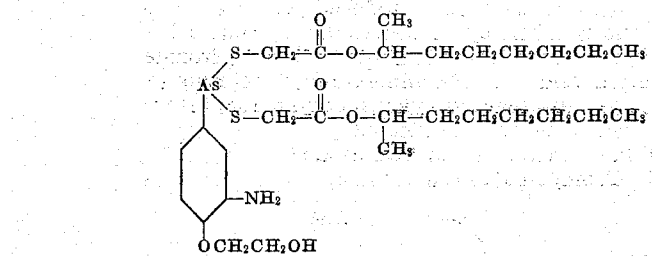
LEON A. SWEET.
EDWARD W. TILLITSON.
REFERENCES CITED
The following references are of record in the file of this patent:
UNITED STATES PATENTS
| Number | Name | Date |
|---|---|---|
| 1,909,498 | Oechslin | May 16, 1933 |
| 2,209,876 | Ewins et al. | July 30, 1940 |
| 2,331,833 | Hamilton | Oct. 12, 1943 |
FOREIGN PATENTS
| Number | Country | Date |
|---|---|---|
| 331,195 | Great Britain | of 1930 |